(12) United States Patent  
Baek et al.

(10) Patent No.: US 9,955,248 B2  
(45) Date of Patent: Apr. 24, 2018

(54) WEARABLE ELECTRONIC DEVICE

(71) Applicant: Samsung Electronics Co., Ltd., Suwon-si, Gyeonggi-do (KR)

(72) Inventors: In Ho Baek, Yongin-si (KR); So Young Lee, Anyang-si (KR); Ji Yeon Jung, Suwon-si (KR); Sang Woo Han, Seongnam-si (KR); Chang Ryong Heo, Suwon-si (KR); In Seok Shim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/438,038

(22) Filed: Feb. 21, 2017

(65) Prior Publication Data

US 2017/0164092 A1 Jun. 8, 2017

Related U.S. Application Data

(63) Continuation of application No. 14/837,583, filed on Aug. 27, 2015, now Pat. No. 9,615,161.

(30) Foreign Application Priority Data

Aug. 28, 2014 (KR) .................. 10-2014-0113258

(51) Int. Cl.
| | |
|---|---|
| *H04R 1/10* | (2006.01) |
| *G06F 1/16* | (2006.01) |
| *H04B 1/3827* | (2015.01) |
| *H04M 1/02* | (2006.01) |
| *H04M 1/05* | (2006.01) |
| *G06F 3/16* | (2006.01) |
| *H04R 29/00* | (2006.01) |

(Continued)

(52) U.S. Cl.  
CPC .......... *H04R 1/1041* (2013.01); *G06F 1/163* (2013.01); *G06F 3/165* (2013.01); *H04B 1/385* (2013.01); *H04M 1/0241* (2013.01); *H04M 1/05* (2013.01); *H04R 1/105* (2013.01); *H04R 1/1091* (2013.01); *H04R 29/001* (2013.01); *H04M 1/6041* (2013.01); *H04R 1/028* (2013.01); *H04R 5/0335* (2013.01); *H04R 2420/07* (2013.01)

(58) Field of Classification Search  
CPC ..... G06F 3/167; H04R 1/1025; H04R 1/1033; H04R 1/1041; H04W 4/008; H04W 12/06  
USPC ...... 351/121, 158; 361/679.03; 381/74, 309, 381/327, 380, 381; 455/41.2  
See application file for complete search history.

(56) References Cited

U.S. PATENT DOCUMENTS 6,091,832 A * 7/2000 Shurman ................ G02C 11/06  
                                                                                        2/422  
6,149,183 A     11/2000 Ford (Continued)

FOREIGN PATENT DOCUMENTS

EP       2 770 704 A1     8/2014

*Primary Examiner* — Gerald Gauthier  
(74) *Attorney, Agent, or Firm* — Jefferson IP Law, LLP

(57) ABSTRACT

A wearable electronic device is provided. The wearable electronic device includes a first part including a first sound output module, a second part including a second sound output module, a third part disposed between the first part and the second part, a flexible first connection unit configured to connect a first end of the first part and a first end of the third part, and a flexible second connection unit configured to connect a first end of the second part and a second end of the third part.

20 Claims, 12 Drawing Sheets

(51) Int. Cl.
*H04M 1/60* (2006.01)
*H04R 1/02* (2006.01)
*H04R 5/033* (2006.01)

(56) References Cited

U.S. PATENT DOCUMENTS

| | | | |
|---|---|---|---|
| 8,249,286 B2* | 8/2012 | Nault | H04R 1/1033 |
| | | | 381/182 |
| 8,362,350 B2 | 1/2013 | Kockovic | |
| 8,465,151 B2* | 6/2013 | Howell | G02C 5/143 |
| | | | 351/121 |
| 8,688,040 B2* | 4/2014 | Jung | A42B 3/30 |
| | | | 455/41.2 |
| 8,831,242 B2 | 9/2014 | Brown et al. | |
| 8,876,285 B2* | 11/2014 | Jannard | H04N 9/3173 |
| | | | 351/158 |
| 8,968,012 B2 | 3/2015 | Olsson et al. | |
| 8,976,987 B2 | 3/2015 | Ozawa et al. | |
| 9,036,847 B2* | 5/2015 | Han | H04R 1/105 |
| | | | 348/55 |
| 9,117,443 B2 | 8/2015 | Walsh | |
| 9,167,329 B2* | 10/2015 | Honeycutt | H04R 1/028 |
| 9,307,310 B2 | 4/2016 | Chang et al. | |
| 9,408,021 B2* | 8/2016 | Park | H04W 4/008 |
| 9,451,350 B2* | 9/2016 | Ide | H04R 1/1025 |
| 9,467,765 B2* | 10/2016 | Siegumfeldt | H04R 1/1041 |
| 9,619,201 B2* | 4/2017 | Jannard | G02C 9/04 |
| 9,826,400 B2* | 11/2017 | Jakobsson | H04W 12/06 |
| 2010/0003874 A1 | 1/2010 | Beltrani | |
| 2010/0020982 A1 | 1/2010 | Brown et al. | |
| 2010/0166207 A1* | 7/2010 | Masuyama | H04R 1/1041 |
| | | | 381/74 |
| 2012/0189136 A1 | 7/2012 | Brown et al. | |
| 2012/0293323 A1 | 11/2012 | Kaib et al. | |
| 2013/0188805 A1 | 7/2013 | Brown et al. | |
| 2013/0198694 A1 | 8/2013 | Rahman et al. | |
| 2013/0238340 A1 | 9/2013 | Walsh | |
| 2014/0107932 A1 | 4/2014 | Luna | |
| 2014/0184801 A1 | 7/2014 | Choi et al. | |
| 2014/0233752 A1 | 8/2014 | Seo et al. | |
| 2014/0320353 A1 | 10/2014 | Lin et al. | |
| 2015/0065893 A1 | 3/2015 | Ye | |
| 2015/0134249 A1 | 5/2015 | Yen | |
| 2015/0172545 A1 | 6/2015 | Szabo et al. | |
| 2015/0301606 A1 | 10/2015 | Andrei | |
| 2015/0305071 A1 | 10/2015 | Lin | |
| 2015/0346877 A1 | 12/2015 | Justice et al. | |
| 2016/0026211 A1* | 1/2016 | Luna | G06F 3/0634 |
| | | | 361/679.03 |
| 2016/0046294 A1 | 2/2016 | Lee et al. | |
| 2016/0066078 A1* | 3/2016 | Baek | G06F 1/163 |
| | | | 381/74 |

* cited by examiner

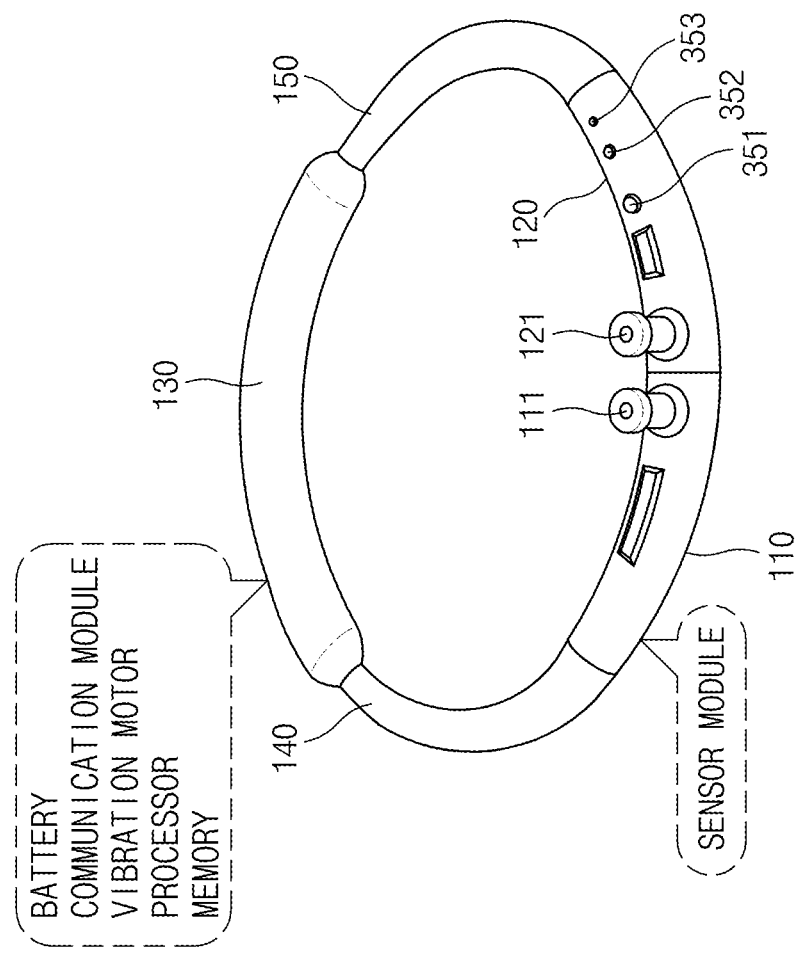

WEARABLE ELECTRONIC DEVICE

CROSS-REFERENCE TO RELATED APPLICATION(S)

This application is a continuation application of prior application Ser. No. 14/837,583, filed on Aug. 27, 2015, which claimed the benefit under 35 U.S.C. § 119(a) of a Korean patent application filed on Aug. 28, 2014 in the Korean Intellectual Property Office and assigned Ser. No. 10-2014-0113258, the entire disclosure of which is hereby incorporated by reference.

TECHNICAL FIELD

The present disclosure relates to a wearable electronic device for transmitting/receiving signals using a wireless or wired connection with an external device.

BACKGROUND

As electronic devices providing various functions, for example, smartphones or tablets, develop, wearable electronic devices such as earphones, headsets, smart watches, or smart glasses, which are used in linkage with the electronic devices, are also utilized.

A touch sensor is typically mounted at an ear tip portion of an earphone or a headset. Therefore, using the touch sensor, it may be determined whether a user wears the earphone or the headset. Also, the sensor may be used to turn on/turn off a device. However, according to the related art, when a user touches a touch sensor with their hand, a malfunction may occur and various surrounding situations of a user may not be recognized efficiently.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and method for determining whether a user uses a device by recognizing a connection or disconnection of a portion of the electronic device through various sensors and controlling various functions on the basis of the recognized information.

In accordance with an aspect of the present disclosure, a wearable electronic device is provided. The wearable electronic device includes a first part including a first sound output module, a second part including a second sound output module, a third part disposed between the first part and the second part, a flexible first connection unit configured to connect a first end of the first part and a first end of the third part, and a flexible second connection unit configured to connect a first end of the second part and a second end of the third part.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3B is a structural diagram illustrating an arrangement of various configurations included in an electronic device according to various embodiments of the present disclosure.

Throughout the drawings, it should be noted that like reference numbers are used to depict the same or similar elements, features, and structures.

DETAILED DESCRIPTION

Figure 1A:
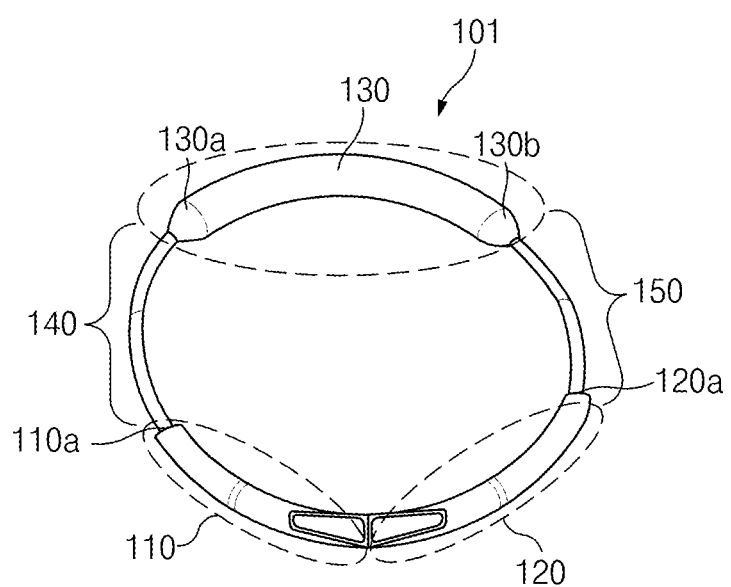
FIGS. 1A and 1B are structural diagrams of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "include," "comprise," "have", "may include," "may comprise" and "may have" used herein indicate disclosed functions, operations, or existence of elements but do not exclude other functions, operations or elements.

For instance, the expression "A or B", or "at least one of A or/and B" may indicate include A, B, or both A and B. For instance, the expression "A or B", or "at least one of A or/and B" may indicate (1) at least one A, (2) at least one B, or (3) both at least one A and at least one B.

The terms such as "1st", "2nd", "first", "second", and the like used herein may refer to modifying various different elements of various embodiments of the present disclosure, but do not limit the elements. The expressions may be used to distinguish one element from another element. For instance, "a first user device" and "a second user device" may indicate different users regardless of the order or the importance. For example, a first component may be referred to as a second component and vice versa without departing from the scope of the present disclosure.

In various embodiments of the present disclosure, it will be understood that when a component (for example, a first component) is referred to as being "(operatively or communicatively) coupled with/to" or "connected to" another component (for example, a second component), the component can be directly connected to the other component or connected through another component (for example, a third component). In various embodiments of the present disclosure, it will be understood that when a component (for example, a first component) is referred to as being "directly connected to" or "directly access" another component (for example, a second component), another component (for example, a third component) does not exist between the component (for example, the first component) and the other component (for example, the second component).

The expression "configured to" used in various embodiments of the present disclosure may be interchangeably used with "suitable for", "having the capacity to", "designed to", "adapted to", "made to", or "capable of" according to a situation, for example. The term "configured to" may not necessarily mean "specifically designed to" in terms of hardware. Instead, the expression "a device configured to" in some situations may mean that the device and another device or part are "capable of". For example, "a processor configured to perform A, B, and C" in a phrase may mean a dedicated processor (for example, an embedded processor) for performing a corresponding operation or a generic-purpose processor (for example, a CPU or application processor) for performing corresponding operations by executing at least one software program stored in a memory device.

Unless otherwise indicated, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning. In any cases, even the terms defined in this specification cannot be interpreted as excluding various embodiments of the present disclosure.

According to various embodiments of the present disclosure, electronic devices may include at least one of smartphones, tablet personal computers (PCs), mobile phones, video phones, electronic book (e-book) readers, desktop PCs, laptop PCs, netbook computers, workstation server, personal digital assistants (PDAs), portable multimedia players (PMPs), Moving Picture Experts Group 1 or 2 (MPEG-1 or MPEG-2) audio layer 3 (MP3) players, mobile medical devices, cameras, and wearable devices (for example, smart glasses, head-mounted-devices (HMDs), electronic apparel, electronic bracelets, electronic necklaces, electronic appcessories, electronic tattoos, smart mirrors, and smart watches).

According to various embodiments of the present disclosure, an electronic device may be smart home appliances. The smart home appliances may include at least one of, for example, televisions (TVs), digital video disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™ or Google TV™), game consoles (for example, Xbox™ and PlayStation™), electronic dictionaries, electronic keys, camcorders, and electronic picture frames.

According to various embodiments of the present disclosure, an electronic device may include at least one of various medical devices supporting call forwarding service (for example, various portable measurement devices (for example, glucometers, heart rate meters, blood pressure meters, temperature meters, etc.), magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (for example, marine navigation systems, gyro compasses, etc.), avionics, security equipment, vehicle head units, industrial or household robots, financial institutions' automatic teller's machines (ATMs), or stores' point of sales (POS) or internet of things (IoT) (for example, bulbs, various sensors, electric or gas meters, sprinkler systems, fire alarms, thermostats, street lights, toasters, exercise equipment, hot water tanks, heaters, boilers, etc.).

In various embodiments of the present disclosure, an electronic device may include at least one of part of furniture or buildings/structures supporting call forwarding service, electronic boards, electronic signature receiving devices, projectors, and various measuring instruments (for example, water, electricity, gas, or radio signal measuring instruments). An electronic device according to various embodiments of the present disclosure may be one of the above-mentioned various devices or a combination thereof. Additionally, an electronic device according to an embodiment of the present disclosure may be a flexible electronic device. Additionally, an electronic device according to an embodiment of the present disclosure is not limited to the above-mentioned devices and may include a new kind of an electronic device according to the technology development.

Hereinafter, an electronic device according to various embodiments of the present disclosure will be described in more detail with reference to the accompanying drawings. The term "user" in this disclosure may refer to a person using an electronic device or a device using an electronic device (for example, an artificial intelligent electronic device).

Figure 1B:
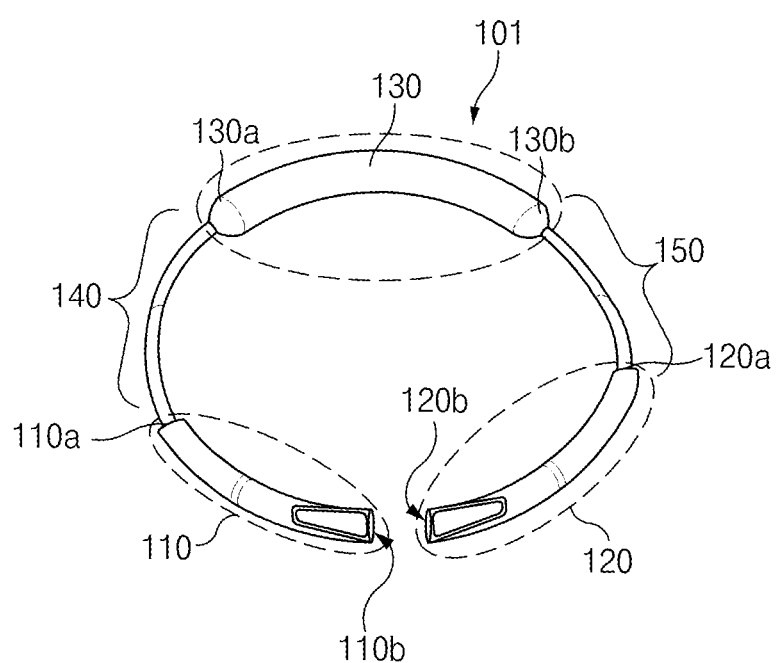

FIGS. 1A and 1B are structural diagrams of an electronic device according to various embodiments of the present disclosure.

Referring to FIGS. 1A and 1B, an electronic device 101 may include a first part 110, a second part 120, a third part 130, a first connection unit 140, and a second connection unit 150. The electronic device 101 may be a device of which at least part is connectable or separable. For example, the electronic device 101 may be a wearable device such as a necklace-type earphone, a headset, an electronic necklace, a band-type device (for example, a wearable head band, a wrist band, etc.), an electronic bracelet, a smart glasses or a goggle. Although a necklace-type earphone or a headset is mainly described, the present disclosure is not limited thereto.

Referring to FIG. 1A, the first part 110 and the second part 120 may include a sound output module (for example, a speaker) to provide sound data to a user. A user may separate the first part 110 from the second part 120 to be disposed adjacent to the ear and check sound data (for example, sound source playback signals and call connection signals).

The first part 110 and the second part 120 may be connected to the third part 130 through the first connection unit 140 and the second connection unit 150. Each of the first part 110 and the second part 120 may include a first end and a second end. The first end 110a of the first part 110 may be connected to the first end 130a of the third part 130 through the first connection unit 140. The first end 120a of the second part 120 may be connected to the second end 130b of the third part 130 through the second connection unit 150.

According to various embodiments of the present disclosure, the first part 110 and the second part 120 may include various user interfaces (for example, a physical or touch button) and may include various sensors. The sensor may collect connection or separation information of the first part 110 and the second part 120 or may collect information about movement or operation of the electronic device 101.

According to various embodiments of the present disclosure, the first part 110 may have a first length and the second part 120 may have a second length. The first length and the second length may be implemented to be substantially identical to each other.

The third part 130 may be disposed between the first part 110 and the second part 120. The third part 130 may include various components (for example, a vibration motor, a battery, and so on) necessary for driving the electronic device 101. For example, when an event such as call reception or message reception is received from a linked external device, the third part 130 may notify a user of the event occurrence through a vibration motor. According to various embodiments of the present disclosure, the third part 130 may have a third length and the third length may be implemented to be longer than the first length (that is, the length of the first part 110) or the second length (that is, the length of the second part 120). However, the present disclosure is not limited thereto and the third length may be implemented to be identical to or shorter than the first length or the second length.

The first connection unit 140 may physically or electrically connect the first part 110 and the third part 130. The first connection unit 140 may be implemented with a flexible material. The second connection unit 150 may physically or electrically connect the second part 120 and the third part 130. The second connection unit 150 may be implemented with a flexible material. According to various embodiments of the present disclosure, the length of the first connection unit 140 may be substantially identical to the length of the second connection unit 150.

According to various embodiments of the present disclosure, when a user separates the first part 110 from the second part 120 to be disposed adjacent to the ear, the first connection unit 140 and the second connection unit 150 may be flexibly bent. The first connection unit 140 and the second connection unit 150 may be housed in a material having a lower rigidity than the first to third parts 110 to 130.

According to various embodiments of the present disclosure, the first to third parts 110 to 130 may maintain a curved form to allow a user to easily wear it on the neck. The first part 110 may be bent in the length direction with a first curvature radius and the second part 120 may be bent in the length direction with a second curvature radius. According to various embodiments of the present disclosure, the first and second curvature radii may be substantially identical to each other. The third part 130 may be bent in the length direction with a third curvature radius.

Referring to FIG. 1B, a second end 110b of the first part 110 and a second end 120b of the second part 120 may be connected or separated. The second end 110b of the first part 110 and the second end 120b of the second part 120 may be implemented in each corresponding form. A user may separate or connect the second end 110b of the first part 110 and the second end 120b of the second part 120 (hereinafter referred to as 'separation or connection of the first part 110 and the second part 120) to wear them on a portion of the body or hang them on a thing such as a bag or a desk.

According to various embodiments of the present disclosure, information about the separation or connection of the first part 110 and the second part 120 and information about each portion's position or state may be recognized through various sensors. The information may be used to perform various functions such as call connection, schedule notification, and sound source playback in linkage with an external device.

According to various embodiments of the present disclosure, the first part 110 and the second part 120 may be connected or separated through the magnetic force of a magnet. The first part 110 or the second part 120 may include a sensor (for example, a hall sensor) for recognizing the magnetic field of the magnet. The information recognized by the sensor may be used to determine whether the first part 110 and the second part 120 are connected or separated. Information about connection or separation through a magnetic may be provided through FIG. 3.

According to various embodiments of the present disclosure, each of the first part 110 and the second part 120 may include a sound output module. The sound output module may be covered by an ear tip. A user may separate the first part 110 from the second part 120 and may plug the sound output module (or an ear tip) into the ear to use various functions such as sound source playback. For example, if a call from a linked external device is received, when a user separates the first part 110 from the second part 120 and plugs the sound output module into the ear, the electronic device 101 may connect the call. For another example, if a user separates the first part 110 from the second part 120 and plugs the sound output module (or an ear tip) into the ear, the electronic device 100 may play a sound source and if a user connects the first part 110 and the second part 120, may stop the sound source playback.

According to various embodiments of the present disclosure, at least one of the first part 110, the second part 120, and the third part 130 may include at least one of a wired or wireless communication module, a processor, a battery, a vibration motor, a storage device, an audio module, a speaker, a microphone, an indicator, a switch, a hall sensor, a touch sensor, an acceleration sensor, a motion sensor, an electrical connector, and a button. Information about the functions and operations of each configuration may be provided through FIGS. 2 to 10.

Figure 2:
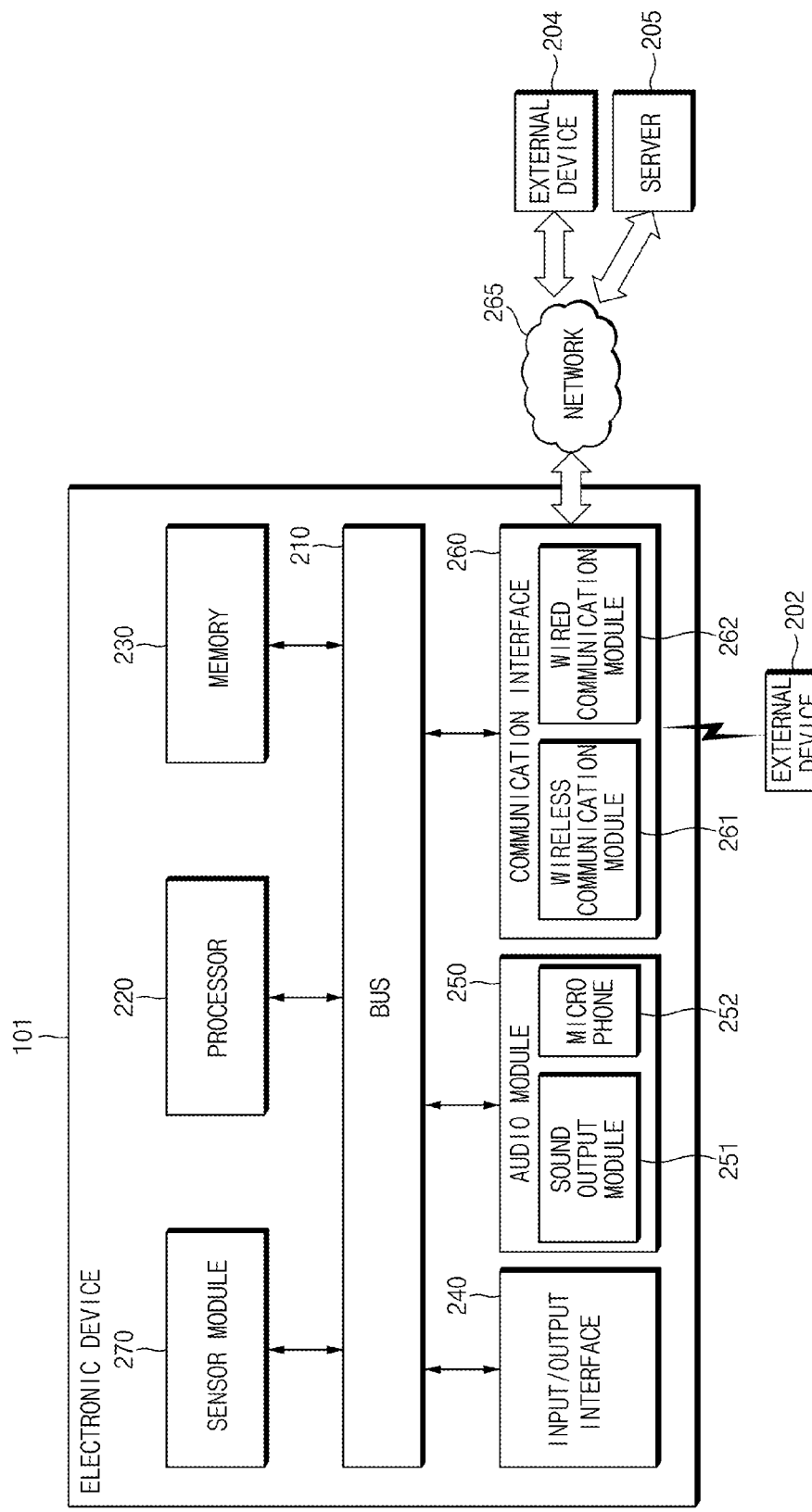
FIG. 2 is a view illustrating an electronic device in a network environment according to various embodiments of the present disclosure.

FIG. 2 is a view illustrating an electronic device in a network environment according to various embodiments of the present disclosure.

Referring to FIG. 2, the electronic device 101 may include a bus 210, a processor 220, a memory 230, an input/output interface 240, an audio module 250, a communication interface 260, and a sensor module 270. According to an embodiment of the present disclosure, the electronic device 101 may omit at least one of the components or may additionally include a different component.

The bus 210, for example, may include a circuit for connecting the components 210 to 270 to each other and delivering a communication (for example, control message and/or data) between the components 210 to 270.

The processor 220 may include at least one of a central processing unit (CPU), an application processor (AP), and a communication processor (CP). The processor 220, for example, may execute calculation or data processing for control and/or communication of at least one another component of the electronic device 101.

According to various embodiments of the present disclosure, the processor 220 may provide the connection or separation information (hereinafter referred to as connection information) of the first part 110 and the second part 120, which is collected by the sensor module 270, to a linked external device (for example, an external device 202, an external device 204, and a server 205). The processor 220 may perform various functions such as call connection, sound source playback, predetermined notification, and so on by using signals and the connection information provided from the external device 202.

The memory 230 may include volatile and/or nonvolatile memory. The memory 230, for example, may store instructions or data relating to at least one another component of the electronic device 101. According to various embodiments of the present disclosure, the memory 230 may store recognition information such as connection information collected by the sensor module 270.

The input/output interface 240, for example, may serve as an interface for delivering instructions or data inputted from a user or another external device to another component(s) of the electronic device 101. According to various embodiments of the present disclosure, the input/output interface 240 may receive a user's button input and voice input to provide them to the processor 220.

Additionally, the input/output interface 240 may output instructions or data received from another component(s) of the electronic device 101 to a user or another external device.

The audio module 250 may convert sound into electrical signals and convert electrical signals into sounds. The audio module 250 may include a sound output module 251 and a microphone 252. For example, a user may listen to music or may check messages and schedules through the sound output module 251. For another example, a user may make a call through the sound output module 251 and the microphone 252.

According to various embodiments of the present disclosure, the audio module 250 may further include an external speaker (not shown). The external speaker may be disposed at the external housing of the electronic device 101 and may notify a user whether an event occurs, for example, call reception and message reception, through sound. The external speaker may be formed separately from the sound output module 251 disposed at the first part 110 and the second part 120.

The communication interface 260, for example, may set communication between the electronic device 101 and an external device (for example, the external device 202, the external device 204, or the server 205). The communication interface 260 may include a wireless communication module 261 and a wired communication module 262. For example, the communication interface 260 may communicate with the external device (for example, the external device 204 or the server 205) in connection to a network 265 through the wireless communication module 261 or the wired communication module 262.

The wireless communication may use long term evolution (LTE), LTE-advanced (LTE-A), code division multiple access (CDMA), wireless CDMA (WCDMA), universal mobile telecommunications system (UMTS), wireless broadband (WiBro), or global system for mobile communications (GSM) as a cellular communication protocol, for example. The wired communication, for example, may include at least one of universal serial bus (USB), high definition multimedia interface (HDMI), recommended standard 232 (RS-232), and plain old telephone service (POTS). The network 265 may include telecommunications network, for example, at least one of computer network (for example, local area network (LAN) or wide area network (WAN)), internet, and telephone network.

According to various embodiments of the present disclosure, the communication interface 260 may perform short-range communication with the external device 202. For example, the short-range communication may be Wi-Fi, Bluetooth (BT), Zigbee, and Z-wave. The communication interface 260 may transmit connection information to the external device 202 and may receive a corresponding control signal from the external device 202. The communication interface 260 may provide the control signal to the processor 220.

According to various embodiments of the present disclosure, the external device 202 may be a device linked to the electronic device 101 through short-range communication. The external device 202 may receive connection information from the electronic device 101 and may transmit a corresponding control signal to the electronic device 101. For example, the control signal may include information for notifying a call for the external device 202 and setting an audio path.

The sensor module 270 may collect connection information of the first part 110 and the second part 120, position or state information, or information about surrounding users, by including various sensors. Information collected through the sensor module 270 may be used inside the electronic device 101 or may be provided to the external device 202 or 204, or the server 205. According to various embodiments of the present disclosure, the sensor module 270 may include various sensors such as a hall sensor, an acceleration sensor, a gyro sensor, a proximity sensor, an illumination sensor, and GPS.

Figure 3A:
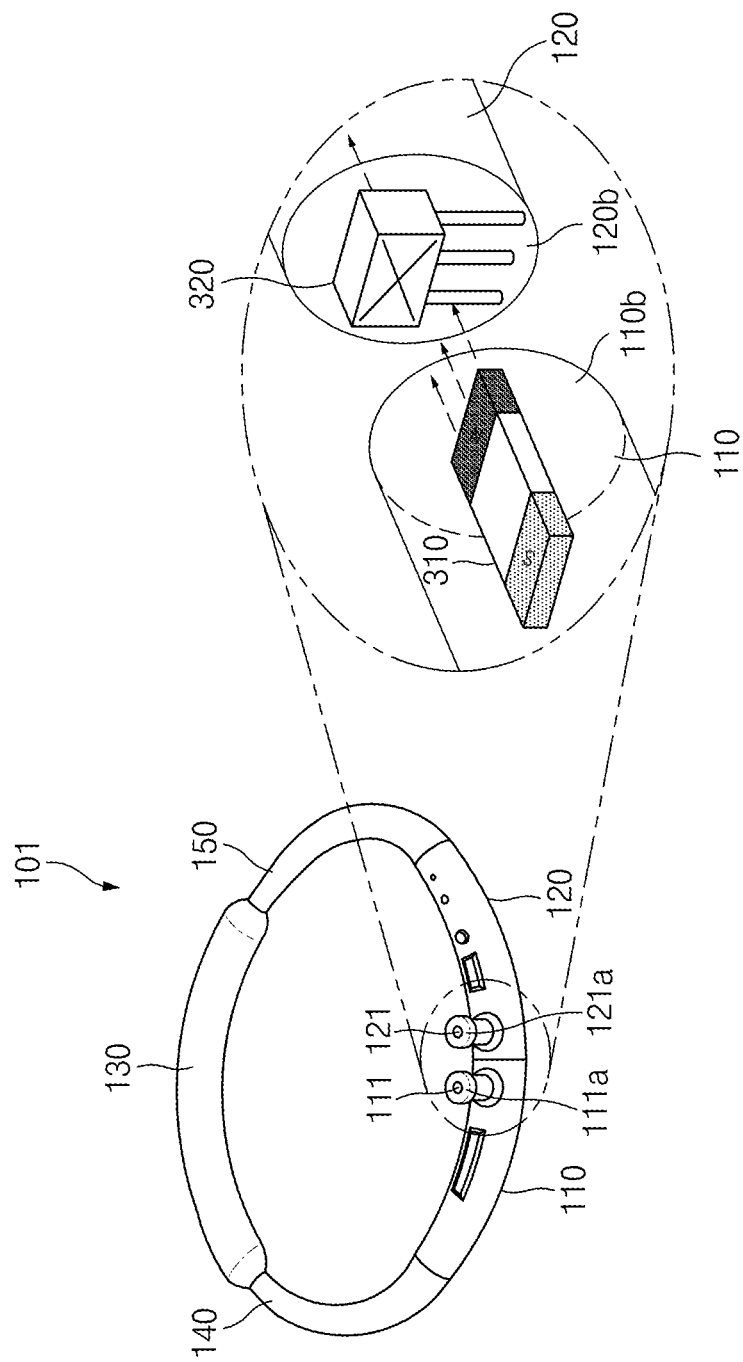
FIG. 3A is a view illustrating a connection structure of first and second parts of an electronic device according to various embodiments of the present disclosure.

FIG. 3A is a view illustrating a connection structure of first and second parts of an electronic device according to various embodiments of the present disclosure.

Referring to FIG. 3A, the first part 110 and the second part 120 may be connected to the third part 130 through the first connection unit 140 and the second connection unit 150. The first end 110a of the first part 110 may be connected to the first end 130a of the third part 130 through the first connection unit 140. The first end 120a of the second part 120 may be connected to the second end 130*b* of the third part 130 through the second connection unit 150.

The second end 110*b* of the first part 110 and the second end 120*b* of the second part 120 may be connected or separated. A user may separate or connect the second end 110*b* and the second end 120*b* to wear the electronic device 101 on at least a portion of the body or hang it on a bag or a desk.

According to various embodiments of the present disclosure, the first part 110 and the second part 120 may respectively include sound output modules 111 and 121. The sound output module 111 may include a first ear tip 111*a* and the sound output module 121 may include a second ear tip 121*a*. The first ear tip 111*a* connected to the sound output module 111 may be disposed adjacent to the second end 110*b* and the second ear tip connected to the sound output module 121 may be disposed adjacent to the second end 120*b*. A user may plug a sound output module (or an ear tip) into the ear to check sound signals.

The first part 110 or the second part 120 may include at least one magnet part 310. The first part 110 and the second part 120 may be connected or separated through the magnetic force of the magnet part 310. The first part 110 or the second part 120 may include at least one sensor 320 and may recognize the magnetic field of the magnet part 310 through the sensor 320. The information recognized by the sensor 210 may be used to determine whether the first part 110 and the second part 120 are connected or separated.

For example, as shown in FIG. 3A, the first part of the electronic device 101 may include the magnetic part 310 and the second part 120 may include the sensor 320. The second part 120 may include a metal material that is detachable from the magnetic part 310. The first part 110 and the second part 120 may be combined by the magnetic force of the magnetic part 310.

For another example, the electronic device 101 may include a magnetic part at each of the first part 110 and the second part 120. In this case, in order for the connection of the first part 110 and the second part 120, the magnetic parts may be disposed to allow different polarities (for example, N pole-S pole or S pole-N pole) to face each other. At least one sensor for magnetic field recognition may be disposed at the first part 110 or the second part 120.

According to various embodiments of the present disclosure, the sensor 320 may be implemented with a hall sensor. As including a hall element, the hall sensor may recognize the intensity of a magnetic field or the direction of a magnetic field, which occurs from the magnetic part 310. The hall element may be a device for recognizing the direction and size of a magnetic field by using the Hall Effect. The Hall Effect is an effect in which when a magnetic field is applied to a conductor, voltage occurs in a vertical direction with respect to current and the magnetic field. The information about magnetic field recognized by each hall element may be used to determine whether the first part 110 and the second part 120 are connected or separated.

According to various embodiments of the present disclosure, when the intensity of a magnetic field recognized by a hall sensor is equal to or greater than (for example, exceeds) a specified value, the processor 220 may recognize that the first part 110 and the second part 120 are connected and when the intensity of a magnetic field is less (or smaller) than the specified value, may determine that they are separated. The processor 220 may control a function of sound source playback or call on the basis of whether parts are connected or separated.

FIG. 3B is a structural diagram illustrating an arrangement of various configurations included in an electronic device according to various embodiments of the present disclosure.

Referring to FIG. 3B, at least one of the first part 110, the second part 120, and the third part 130 may include at least one of a wired or wireless communication module, a processor, a battery, a vibration motor, a memory, a microphone, an indicator, and a sensor (for example, a hall sensor, a touch sensor, an acceleration sensor, a motion sensor, and so on).

According to various embodiments of the present disclosure, the first part 110 or the second part 120 may include a power button 351, a microphone 352, and an indicator 353. A user may turn on/off the electronic device 101 by pressing the power button 351. According to various embodiments of the present disclosure, the power button 351 may be used for various functions such as call connection and sound source play/stop while the electronic device 101 is turned on. The microphone 352 may covert sound signals into electrical signals and may be used for functions such as voice call and voice recognition. The indicator 353 may notify a user of an operating state and a battery power state of the electronic device 101 by using a light emitting diode (LED).

According to various embodiments of the present disclosure, the first part 110 or the second part 120 may include various sensors therein (for example, a hall sensor, a touch sensor, an acceleration sensor, a motion sensor, and so on). The sensor module may detect the position or state of the first part 110 or the second part 120. According to various embodiments of the present disclosure, the third part 130 may include a battery, a communication module, a vibration motor, a memory, and a processor in the housing. FIG. 3B is merely exemplary and the present disclosure is not limited thereto. For example, the third part 130 may include a sensor or a button and the first part 110 or the second part 120 may include a processor, a storage device, and so on.

Figure 4A:
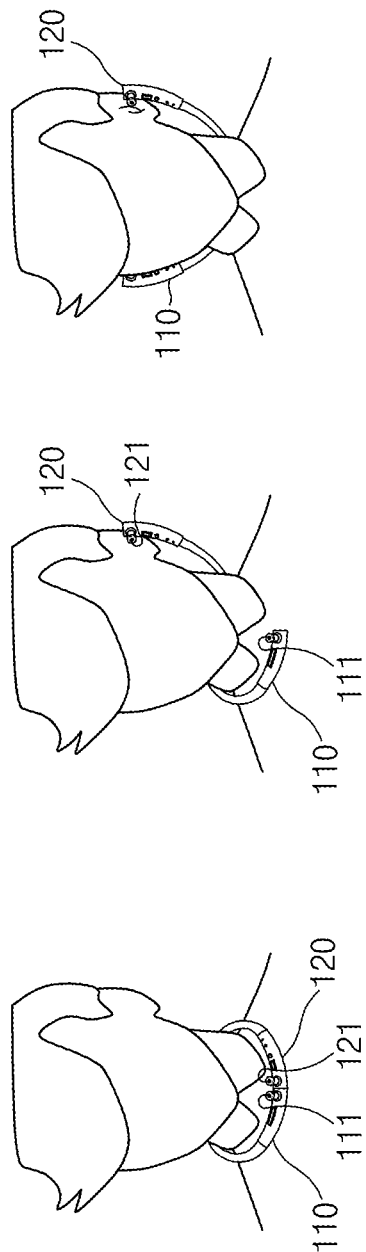
FIG. 4A is a view illustrating wearing an electronic device according to various embodiments of the present disclosure.

FIG. 4A is a view illustrating wearing an electronic device according to various embodiments of the present disclosure.

Referring to FIG. 4A, as connecting the first part 110 and the second part 120 of the electronic device 101, a user may wear it in a necklace form. For example, the electronic device 101 may correspond to a necklace type earphone, a headset, or an electronic necklace. The first part 110 and the second part 120 may respectively include sound output modules 111 and 121. Each of the sound output modules 111 and 121 may include an ear tip. A user may plug a sound output module (or an ear tip) into the ear to check sound signals.

According to various embodiments of the present disclosure, as including an acceleration sensor, a gyro sensor, or a touch sensor, the electronic device 101 may detect whether a user wears a device. For example, on the basis of a recognition result of an acceleration sensor and a gyro sensor, when the electronic device 101 is disposed in a specified tilt range, the processor 220 may determine that a user wears the electronic device 101 and when the electronic device 101 is disposed out of the specified tilt range, may determine that a user does not wear the electronic device 101, and hangs it on a desk or a bag, or leave it on the floor. When it is determined that a user wears the electronic device 101, the processor 220 may activate a function such as call connection and when it is determined that a user does not wear the electronic device 101, may perform an operation such as button lock and turn-off.

A user may use one or both of the first part 110 and the second part 120. According to various embodiments of the present disclosure, when a user uses one of the first part 110 and the second part 120, the processor 220 may be set to operate only the sound output module of a part in use on the basis of recognition information through various sensors. For example, when recognition information of an acceleration sensor included in the first part 110 is equal to or greater than a specified value, the processor 220 may be set to activate the sound output module 111.

According to various embodiments of the present disclosure, the electronic device 101 may include a microphone for call or voice recognition. When a user plugs the sound output module 111 or 121 into the ear, the microphone may be disposed in a point adjacent to the mouth.

Figure 4B:
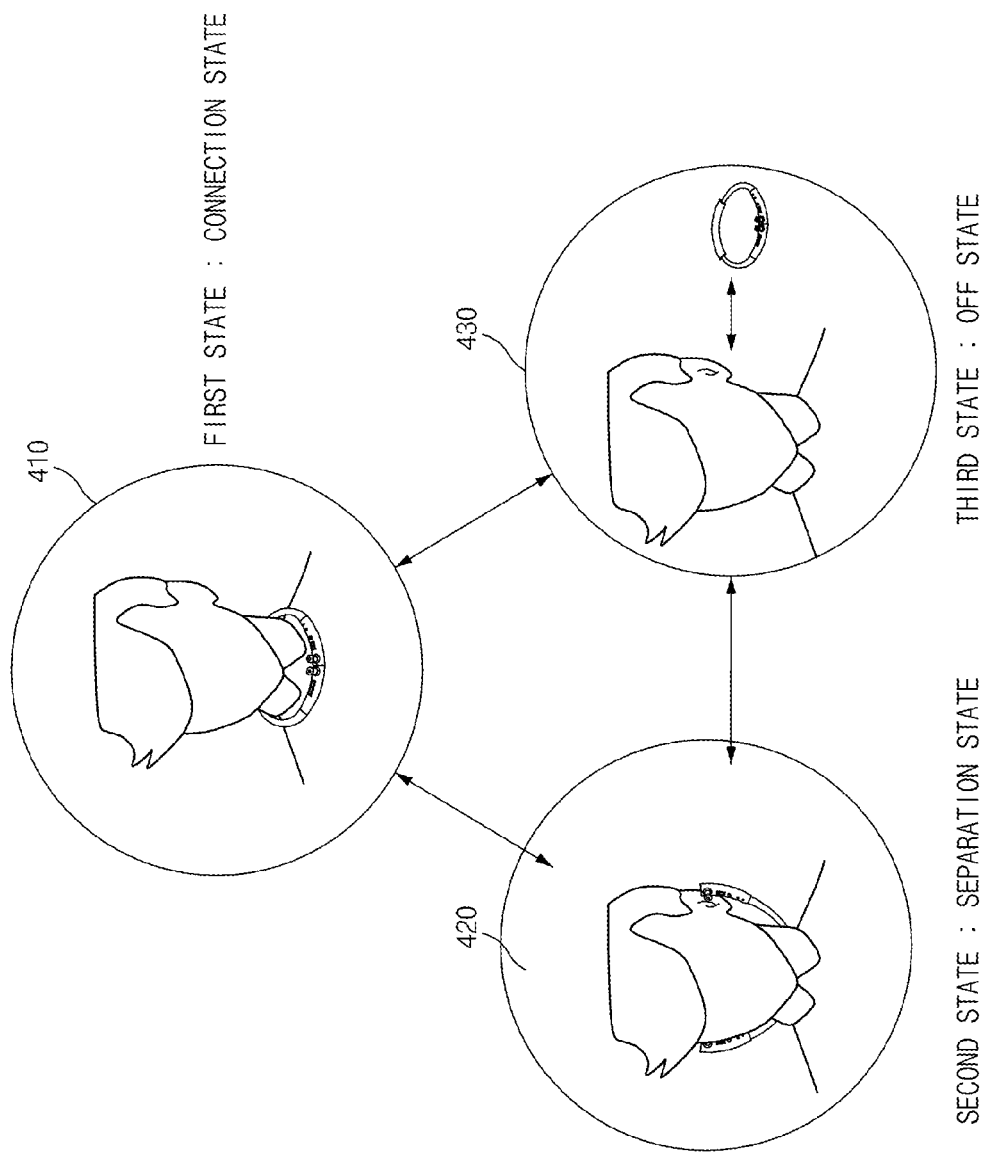
FIG. 4B is a state change diagram of an electronic device according to various embodiments of the present disclosure.

FIG. 4B is a state change diagram of an electronic device according to various embodiments of the present disclosure.

Referring to FIG. 4B, in a first state 410, as the first part 110 and the second part 120 are connected, the electronic device 101 may be worn on a user's neck. The first state 410 may be a state in which the electronic device 101 is paired with an external device (for example, the external device 102). According to various embodiments of the present disclosure, on the basis of a recognition result of an acceleration sensor, a gyro sensor, and so on, the electronic device 101 may determine that a user wears the electronic device. In the first state 410, the processor 220 may disable or deactivate at least part of a user interface. For example, the processor 220 may activate only some buttons (for example, a power button or a call button) and may deactivate the other buttons. According to various embodiments of the present disclosure, the processor 220 may activate at least one of a vibration motor, an acceleration sensor, and a motion sensor to be driven in the first state 410.

In a second state 420, as the first part 110 and the second part 120 are separated, the electronic device 101 may be worn on a user's neck. The second state 420 may be in a state of transmitting/receiving sound data to/from an external device (for example, the external device 102) through the wireless communication module 261. In the second state 420, the processor 220 may enable or activate at least part of a user interface. For example, the processor 220 may activate a power button and volume button.

According to various embodiments of the present disclosure, as the first part 110 and the second part 120 are separated in a connection state (hereinafter referred to as a separation operation), the electronic device 101 may switch from the first state 410 into the second state 420. As the first part 110 and the second part 120 are connected in a separation state (hereinafter referred to as a connection operation), the electronic device 101 may switch from the second state 420 into the first state 410.

In a third state 430, the electronic device 101 may be in a state of being separated from a user. The third state 430 may be in a state of substantially turning off all functions of the electronic device 101. According to various embodiments of the present disclosure, on the basis of a recognition result of an acceleration sensor and a gyro sensor, when the electronic device 101 is disposed out of the specified tilt range, the processor 220 may determine that a user does not wear the electronic device 101, and hangs it on a desk or a bag, or leave it on the floor.

Figure 5:
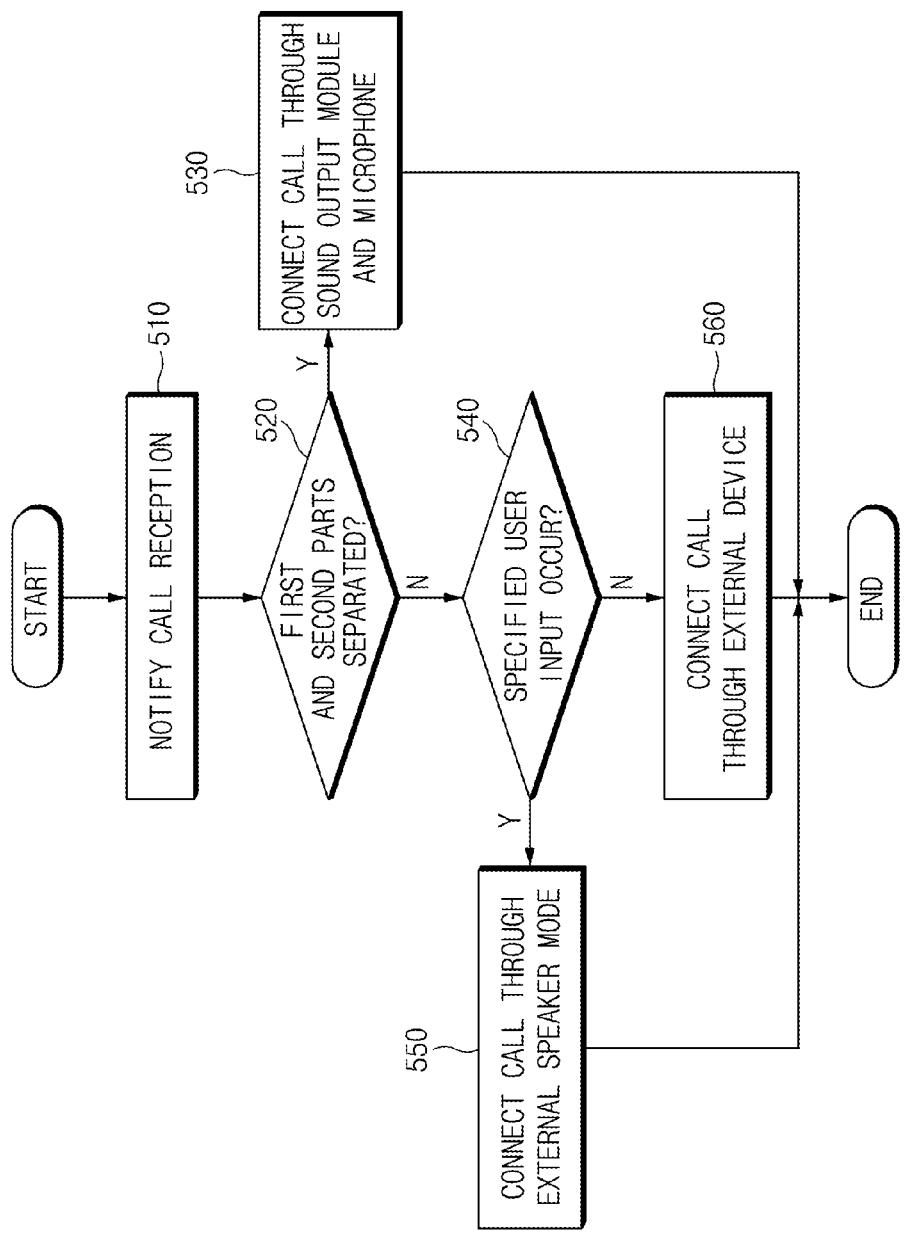
FIG. 5 is a flowchart illustrating a call connection process through an electronic device according to various embodiments of the present disclosure.

FIG. 5 is a flowchart illustrating a call connection process through an electronic device according to various embodiments of the present disclosure. Hereinafter, although call reception is mainly described, the present disclosure is not limited thereto and this may be applied to various functions schedule notification, message notification, and alarm.

Referring to FIG. 5, when the electronic device 101 receives a call from the external device 202, the processor 220 may notify a user of the call reception in operation 510. When the first and second parts 110 and 120 are connected (hereinafter referred to as a connection state), the electronic device 101 may notify a user of the call reception through a vibration motor or an external speaker. The vibration motor may be disposed at the third part 130 that is a back portion of the user's neck. The external speaker may be disposed at the external housing of the electronic device 101 and may notify a user whether an event occurs, for example, call reception and message reception, through sound. The external speaker may be formed separately from the sound output module 111 or 121 disposed at the first part 110 or the second part 120. When a user does not plug the sound output module 111 or 121 into the ear, the external speaker may notify a user of an event occurrence such as call reception.

According to various embodiments of the present disclosure, the external speaker may be replaced with a mode for maintaining an output of the sound output module to be more than a specified value. Hereinafter, although it is described that the external speaker is formed separated from the sound output module 111 or 121, the present disclosure is not limited thereto.

When receiving the call as the first and second parts 110 and 120 are separated (hereinafter referred to as a separation state), the processor 220 may notify a user of call reception in a text to speech (TTS) method through a sound output module included in each part. For example, the processor 220 may output sender information by voice through a sound output module as receiving the sender information from the external device 202. In this case, a user may start a call connection through an additional button input or voice input.

According to various embodiments of the present disclosure, in a separation state, as the first and second parts 110 and 120 are connected to each other without an additional user input, the processor 220 may transmit a call reject signal to the external device 202.

In operation 520 to operation 560, an operation of receiving the call in a connection state will be described.

In operation 520, after notifying a user of the call reception, the processor 220 may check whether the first part 110 and the second part 120 are separated in a connection state. A user may separate the first part 110 from the second part 120 and plug the sound output module 111 or 121 (or an ear tip) into the ear to start making the call.

In operation 530, when a user separates the first part 110 from the second part 120, the processor 220 may start making the call through a sound output module and a microphone. According to various embodiments of the present disclosure, by using an acceleration sensor, the processor 220 may be set to allow a sound output module included in each of the first part 110 and the second part 120 to have different outputs.

In operation 540, if the first part 110 and the second part 120 are not separated in a connection state, the processor 220 may check whether an additional specified user input occurs. The user input may be a predetermined type input that a user starts a call without separating the first part 110 and the second part 120. For example, the user input may be a button input, a voice input, and a motion input.

In operation 550, when a specified user input occurs, the processor 220 may connect a call through an external speaker and a microphone (hereinafter referred to as an external speaker mode). A user may freely make a call through an external speaker mode without plugging the sound output module 111 or 121 (or an ear tip). According to various embodiments of the present disclosure, as a call is continued in an external speaker mode, if a user separates the first part 110 from the second part 120, the processor 220 may switch an audio path to a sound output module.

According to various embodiments of the present disclosure, the electronic device 101 may collect movement information or position information of a device by using various sensors (for example, an acceleration sensor, a gyro sensor, GPS, and so on). The processor 220 may automatically activate or deactivate an external speaker mode on the basis of the movement information or the position information). For example, on the basis of a recognition result of an acceleration sensor and GPS, when it is determined that a user is driving or is in a difficult situation and unable to use their hand, the processor 220 may automatically switch to an external speaker mode with respect to call reception in order to provide user's convenience.

In operation 560, when an additional user input does not occur, a received call may be connected through the external device 202. According to various embodiments, when the electronic device 101 receives a call in a separation state, the external device 202 may provide a screen for determining an audio path to a user. For example, when receiving a call, the external device 202 may provide a screen for determining whether to connect a call through a paired device like the electronic device 101 or connect a call through the external device 102 directly. A user may select a desired device and start a call through the selected device.

Figure 6A:
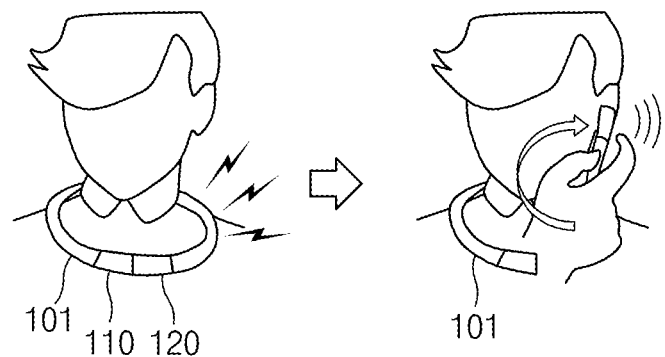
FIGS. 6A, 6B, and 6C are views illustrating a call connection method according to various embodiments of the present disclosure.
Figure 6B:
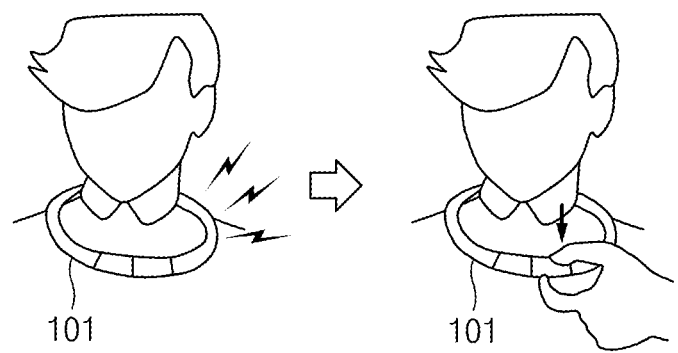
Figure 6C:
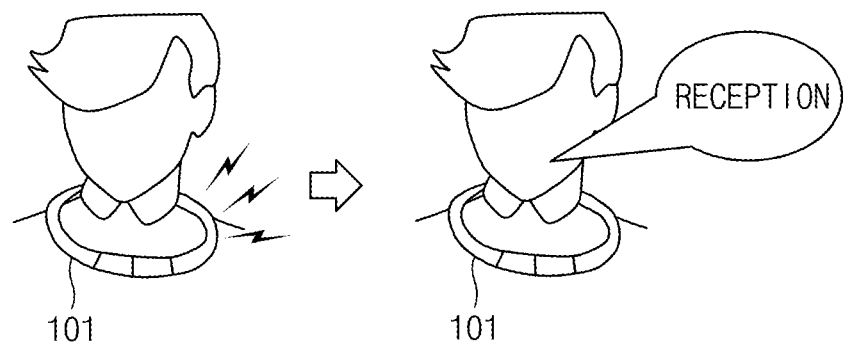

FIGS. 6A to 6C are views illustrating a call connection method according to various embodiments of the present disclosure. Although a call connection is exemplarily described with FIGS. 6A to 6C, the present disclosure is not limited thereto and this may be applied to functions such as schedule notification, message check, schedule check, and alarm.

Referring to FIG. 6A, a user may wear the electronic device 101 in a connection state and check that a call reception for the linked external device 202 occurs. For example, a user may check a call reception through a vibration motor or an external speaker.

A user may separate the first part 110 from the second part 120 and plug a sound output module (or an ear tip) into the ear to start making the call. A user may select one side call or a both sides call according to the convenience. When the first part 110 and the second part 120 are separated from each other, the processor 220 may allow a call to start by transmitting separation information or call reception request signal to the external device 202. According to various embodiments of the present disclosure, when the first part 110 and the second part 120 are connected again, the processor 220 may end the call.

According to various embodiments of the present disclosure, when a specified outgoing request voice (for example, 'XXX call') is inputted through a microphone in a separation state, the processor 220 may transmit a call connection request signal to the external device 202. The external device 202 may generate a call for a specified receiver by the outgoing request voice. In this case, the processor 220 may set an audio path as a sound output module and a microphone.

Referring to FIG. 6B or 6C, a user may connect a call or check a notification through various kinds of inputs without separating the first part 110 from the second part 120 in a connection state. Referring to FIG. 6B, as recognizing a call reception, a user may start a call connection by pressing a button (for example, a physical button or a touch button) formed at an external portion of the electronic device 101.

In this case, the processor 220 may set an audio path as an external speaker and a microphone.

Referring to FIG. 6C, as recognizing a call reception, a user may start a call connection by inputting a predetermined voice. For example, a user may start a call through a voice input such as "receive" or "call" without using their hand. A user may start a call or check a schedule through their voice in an environment in which using their hands freely is difficult, like driving. According to various embodiments of the present disclosure, the electronic device 101 may recognize an operation of a user with an illumination sensor or a proximity sensor and may start a call on the basis of recognition information. For example, when a call reception is notified through a vibration module, as a user provides a specified operation (for example, an action of waving hands in front of the electronic device 101), the electronic device 100 may start a call through an external speaker and a microphone. According to various embodiments of the present disclosure, after starting a call in a connection state, if the first part 110 is separated from the second part 120, the processor 220 may change an audio path to connect a call through a sound output module and a microphone.

Figure 7:
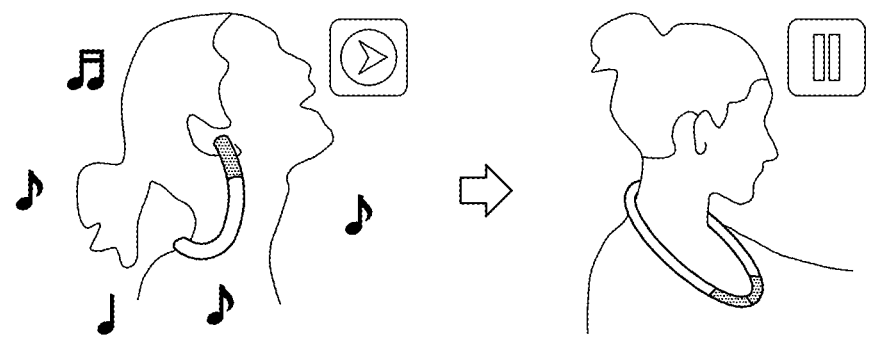
FIG. 7 is a view illustrating sound source playback through an electronic device according to various embodiments of the present disclosure.

FIG. 7 is a view illustrating sound source playback through an electronic device according to various embodiments of the present disclosure.

Referring to FIG. 7, a user may separate parts and listen to a sound source. The sound source may be stored in the electronic device 101 or stored in the linked external device 202. For example, when a sound source is stored in the external device 202, the electronic device 101 may receive an audio signal for sound source from the linked external device 202 and may generate a sound according to the audio signal.

The processor 220 may control sound source playback on the basis of connection or separation information of the first part 110 and the second part 120. For example, when the first part 110 and the second part 120 are separated, the processor 220 may be set to automatically play a sound source. Then, when the first part 110 and the second part 120 are connected, the processor 220 may stop the sound source playback automatically. When the first part 110 and the second part 120 are separated again, the processor 220 may play music again or when the first part 110 and the second part 120 are not separated for a specified time, may turn off the electronic device 101. A user may separate or connect the first part 110 and the second part 120 without an additional manipulation to listen to music conveniently.

According to various embodiments of the present disclosure, the processor 220 may control an adaptive noise cancellation (ANC) function on the basis of connection separation information of the first part 110 and the second part 120. When the first part 110 and the second part 120 are separated, the processor 220 may activate the ANC function and when they are connected, may deactivate the ANC function.

According to various embodiments of the present disclosure, when a call about the external device 202 is received during sound source playback, the processor 220 may stop sound source playback and may provide sender information by a TTS method. The processor 220 may continuously play a sound source after a call is ended.

Figure 8A:
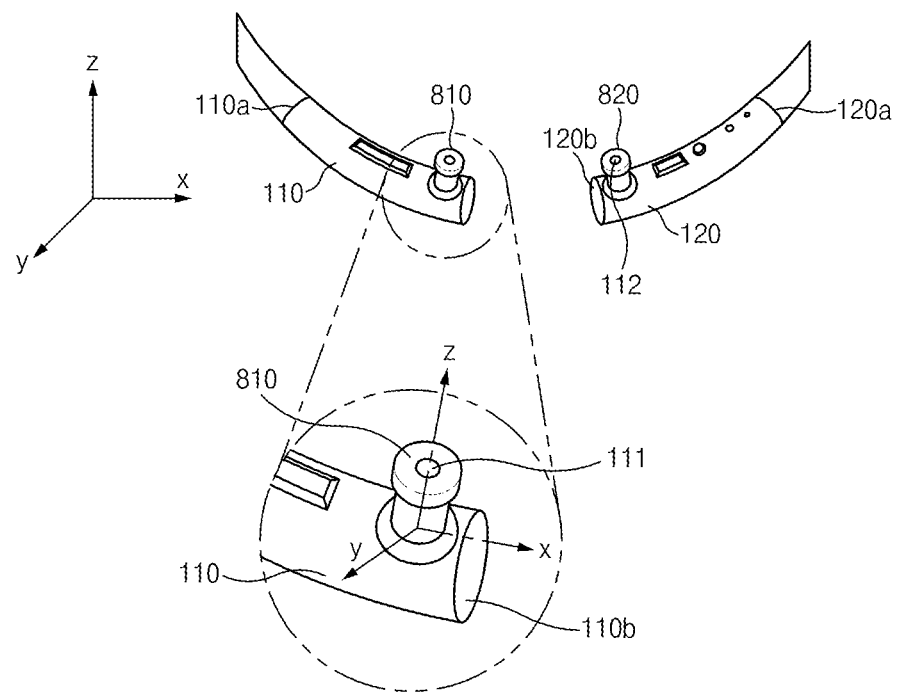
FIG. 8A is a configuration view illustrating ear tips of a first part and a second part according to various embodiments of the present disclosure.

FIG. 8A is a configuration view illustrating ear tips of a first part and a second part according to various embodiments of the present disclosure.

Referring to FIG. 8A, the first part 110 and the second part 120 may respectively include sound output modules 111 and 121. The sound output modules 111 and 121 may include a first ear tip 810 and a second ear tip 820, respectively. A user may plug the ear tips 810 and 820 into the ears to listen to music or connect a call.

According to various embodiments of the present disclosure, the first ear tip 810 may be disposed adjacent to the second end 110b and the second ear tip 820 may be disposed adjacent to the second end 120b.

The first ear tip 810 may form a specified first angle with respect to the length direction (for example, x+ direction) of the first part 110. The second ear tip 820 may form a specified second angle with respect to the length direction (for example, x− direction) of the second part 120. The first angle and the second angle may be identical to each other. However, the present disclosure is not limited thereto and the formation angle of the first ear tip 810 and the second ear top 820 may be adjusted to an angle that is used by a user conveniently. According to various embodiments of the present disclosure, the electronic device 101 may dispose a configuration for connection of the first part 110 and the second part 120 (for example, a magnetic part) and a configuration for sound output (for example, a sound output module or an ear tip) at different angles (for example, 90°), thereby reducing the influence of noise caused by magnetic field.

FIG. 8A is merely exemplary and the present disclosure is not limited thereto. According to various embodiments of the present disclosure, the first angle and the second angle may be determined in consideration of the position of a user's ear and the form of a part.

Figure 8B:
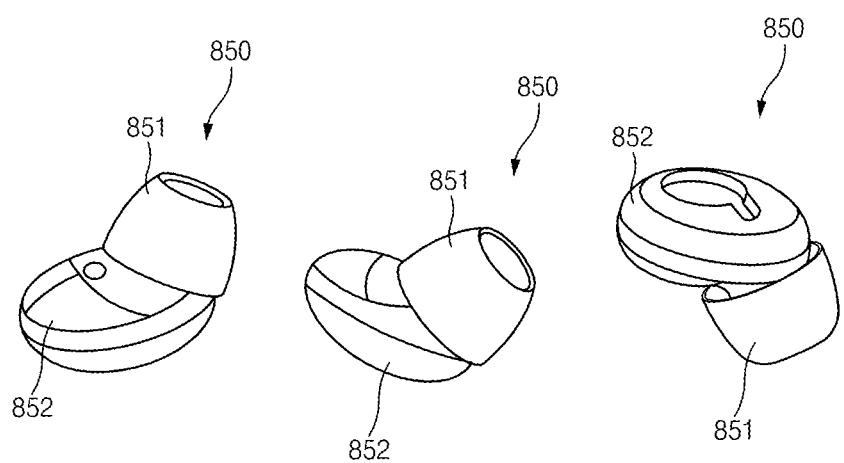
FIG. 8B is a configuration view of an integrated ear tip according to various embodiments of the present disclosure.

FIG. 8B is a configuration view of an integrated ear tip according to various embodiments of the present disclosure.

Referring to FIG. 8B, a first ear tip and a second ear tip may be implemented with an integrated type (for example, an integrated ear tip 850) of being combined with at least part of the first part 110 and the second part 120.

The integrated ear tip 850 may include an insertion part 851 and a protruding part 852. The insertion part 851 is a part that is inserted into the ear by a user to check sound data and may be implemented with a flexible material such as silicon. The protruding part 852 may have a configuration in which it is connected to the first part 110 or the second part 120 and may be implemented with the same or similar material to the housing of the electronic device 101 and may have a stronger rigidity than the insertion part 851.

Figure 9:
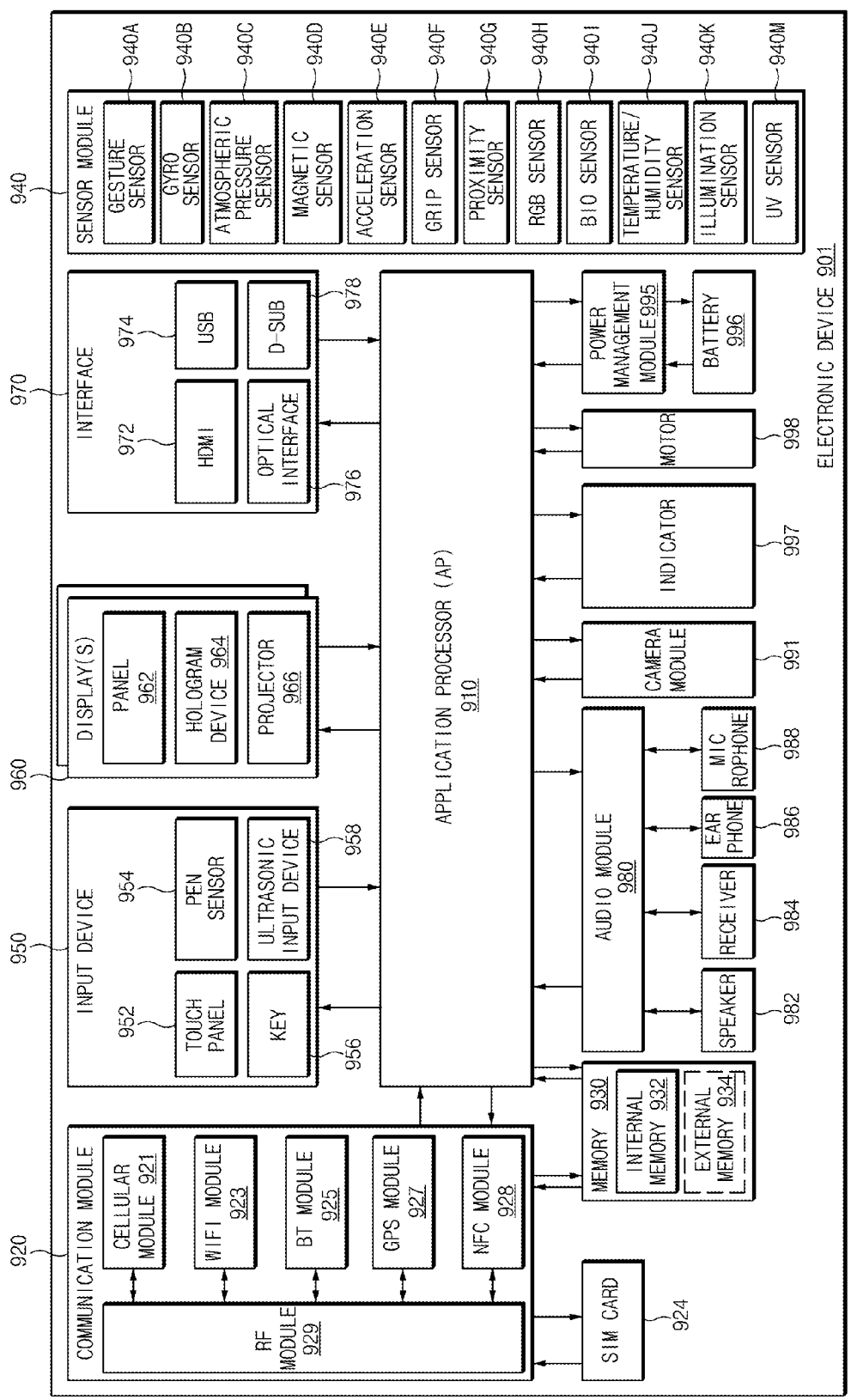
FIG. 9 is a block diagram illustrating an electronic device according to various embodiments of the present disclosure.

FIG. 9 is a block diagram of an electronic device according to various embodiments of the present disclosure.

Referring to FIG. 9, the electronic device 901, for example, may configure all or part of the above-mentioned electronic device 101 shown in FIG. 1. The electronic device 901 may include an AP 910, a communication module 920, a subscriber identification module (SIM) card 924, a memory 930, a sensor module 940, an input device 950, a display 960, an interface 970, an audio module 980, a camera module 991, a power management module 995, a battery 996, an indicator 997, and a motor 998.

The AP 910 may control a plurality of hardware or software components connected to the AP 910 and also may perform various data processing and operations by executing an operating system or an application program. The AP 910 may be implemented with a system on chip (SoC), for example. According to an embodiment of the present disclosure, the AP 910 may further include a graphics processing unit (GPU) (not shown) and/or an image signal processor (ISP). The AP 910 may include at least part of other components shown in FIG. 9. The AP 910 may load commands or data received from at least one of other components (for example, nonvolatile memory) and process them and may store various data in a nonvolatile memory.

The communication module 920 may have the same or similar configuration to the communication interface 260 of FIG. 2. The communication module 920 may include a cellular module 921, a Wi-Fi module 923, a BT module 925, a GPS module 927, a near field communication (NFC) module 928, and a radio frequency (RF) module 929.

The cellular module 921, for example, may provide voice call, video call, text service, or internet service through communication network. According to an embodiment of the present disclosure, the cellular module 921 may perform a distinction and authentication operation on the electronic device 901 in a communication network by using a SIM (for example, the SIM card 924). According to an embodiment of the present disclosure, the cellular module 921 may perform at least part of a function that the AP 910 provides. According to an embodiment of the present disclosure, the cellular module 921 may further include a CP.

Each of the Wi-Fi module 923, the BT module 925, the GPS module 927, and the NFC module 928 may include a processor for processing data transmitted/received through a corresponding module. According to an embodiment of the present disclosure, at least part (for example, at least one) of the cellular module 921, the Wi-Fi module 923, the BT module 925, the GPS module 927, and the NFC module 928 may be included in one integrated chip (IC) or IC package.

The RF module 929, for example, may transmit/receive communication signals (for example, RF signals). The RF module 929, for example, may include a transceiver, a power amplifier module (PAM), a frequency filter, a low noise amplifier (LNA), or an antenna. According to another embodiment of the present disclosure, at least one of the cellular module 921, the Wi-Fi module 923, the BT module 925, the GPS module 927, and the NFC module 928 may transmit/receive RF signals through a separate RF module.

The SIM card 924 may include a card including a SIM and/or an embedded SIM and also may include unique identification information (for example, an integrated circuit card identifier (ICCID)) or subscriber information (for example, an international mobile subscriber identity (IMSI)).

The memory 930 (for example, the memory 230) may include an internal memory 932 or an external memory 934. The internal memory 932 may include at least one of a volatile memory (for example, dynamic random access memory (DRAM), static RAM (SRAM), synchronous DRAM (SDRAM)) and a non-volatile memory (for example, one time programmable read only memory (OTPROM), programmable ROM (PROM), erasable and programmable ROM (EPROM), electrically erasable and programmable ROM (EEPROM), mask ROM, flash ROM, not and (NAND) flash memory, and not or (NOR) flash memory).

The external memory 934 may further include flash drive, for example, compact flash (CF), secure digital (SD), micro-SD, mini-SD, extreme digital (xD), or a memorystick. The external memory 934 may be functionally and/or physically connected to the electronic device 901 through various interfaces.

The sensor module 940 measures physical quantities or detects an operating state of the electronic device 901, thereby converting the measured or detected information into electrical signals. The sensor module 940 may include at least one of a gesture sensor 940A, a gyro sensor 940B, a barometric pressure sensor 940C, a magnetic sensor 940D, an acceleration sensor 940E, a grip sensor 940F, a proximity sensor 940G, a color sensor 940H (for example, a red, green, blue (RGB) sensor), a biometric sensor 940I, a temperature/humidity sensor 940J, an illumination sensor 940K, and an ultraviolet (UV) sensor 940M. Additionally or alternatively, the sensor module 940 may include an E-nose sensor, an electromyography (EMG) sensor, an electroencephalogram (EEG) sensor, an electrocardiogram (ECG) sensor, an infrared (IR) sensor, an iris sensor, or a fingerprint sensor. The sensor module 940 may further include a control circuit for controlling at least one sensor therein. According to an embodiment of the present disclosure, the electronic device 901 may further include a processor configured to control the sensor module 940 as part of or separately from the AP 910 and thus may control the sensor module 940 while the AP 910 is in a sleep state.

The input device 950 may include a touch panel 952, a (digital) pen sensor 954, a key 956, or an ultrasonic input device 958. The touch panel 952 may use at least one of capacitive, resistive, infrared, or ultrasonic methods, for example. Additionally, the touch panel 952 may further include a control circuit. The touch panel 952 may further include a tactile layer to provide tactile response to a user.

The (digital) pen sensor 954, for example, may include a sheet for recognition as part of a touch panel or a separate sheet for recognition. The key 956 may include a physical button, an optical key, or a keypad, for example. The ultrasonic input device 958 may check data by detecting sound waves through a microphone (for example, a microphone 988) in the electronic device 901 through an input tool generating ultrasonic signals.

The display 960 (for example, the display 250) may include a panel 962, a hologram device 964, or a projector 966. The panel 962 may have the same or similar configuration to the display 250 of FIG. 2. The panel 962 may be implemented to be flexible, transparent, or wearable, for example. The panel 962 and the touch panel 952 may be configured with one module. The hologram 964 may show three-dimensional images in the air by using the interference of light. The projector 966 may display an image by projecting light on a screen. The screen, for example, may be placed inside or outside the electronic device 901. According to an embodiment of the present disclosure, the display 960 may further include a control circuit for controlling the panel 962, the hologram device 964, or the projector 966.

The interface 970 may include a HDMI 972, a USB 974, an optical interface 976, or a D-subminiature (D-sub) 978, for example. The interface 970, for example, may be included in the communication interface 260 shown in FIG. 2. Additionally or alternately, the interface 970 may include a mobile high-definition link (MHL) interface, an SD card/multi-media card (MMC) interface, or an infrared data association (IrDA) standard interface.

The audio module 980 may convert sound into electrical signals and convert electrical signals into sounds. At least some components of the audio module 980, for example, may be included in the input/output interface 240 shown in FIG. 2. The audio module 980 may process sound information inputted/outputted through a speaker 982, a receiver 984, an earphone 986, or a microphone 988.

The camera module 991, as a device for capturing a still image and a video, may include at least one image sensor (for example, a front sensor or a rear sensor), a lens (not shown), an ISP (not shown), or a flash (not shown) (for example, an LED or a xenon lamp).

The power management module 995 may manage the power of the electronic device 901. According to an embodiment of the present disclosure, the power management module 995 may include a power management IC (PMIC), a charger IC, or a battery or fuel gauge, for example. The PMIC may have a wired and/or wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added. The battery gauge may measure the remaining amount of the battery 996, or a voltage, current, or temperature thereof during charging. The battery 996, for example, may include a rechargeable battery and/or a solar battery.

The indicator 997 may display a specific state of the electronic device 901 or part thereof (for example, the AP 910), for example, a booting state, a message state, or a charging state. The motor 998 may convert electrical signals into mechanical vibration and may generate vibration or haptic effect. Although not shown in the drawings, the electronic device 901 may include a processing device (for example, a GPU) for mobile TV support. A processing device for mobile TV support may process media data according to the standards such as digital multimedia broadcasting (DMB), digital video broadcasting (DVB), or media flow.

An electronic device according to various embodiments of the present disclosure may be a wearable electronic device. The wearable electronic device may include a first part including a first sound output module, a second part including a second sound output module, a third part disposed between the first part and the second part, a flexible first connection unit configured to connect a first end of the first part and a first end of the third part, and a flexible second connection unit configured to connect a first end of the second part and a second end of the third part.

According to various embodiments of the present disclosure, a second end of the first part and a second end of the second part include a connectable or separable structure or configuration. The structure or the configuration is implemented to be attracted to each other by magnetic force.

According to various embodiments of the present disclosure, the first sound output module includes a first ear tip and the second sound output module includes a second ear tip. The first ear tip is disposed adjacent to the second end of the first part and the second ear tip is disposed adjacent to the second end of the second part. The first ear tip is formed with a specified first angle with respect to a length direction of the first part, the second ear tip is formed with a specified second angle with respect to a length direction of the second part, and the second angle is identical to or different from the first angle.

According to various embodiments of the present disclosure, the first part includes a first housing including a material with a higher rigidity than the first connection unit or the second connection unit and the second part includes a second housing including the material. The third part includes a housing including a material with a higher rigidity than the first connection unit or the second connection unit.

According to various embodiments of the present disclosure, at last one of the second end of the first part and the second end of the second part includes a sensor. The sensor includes a hall sensor. The first part and the third part are electronically connected through the first connection unit and the second part and the third part are electronically connected through the second connection unit.

According to various embodiments of the present disclosure, the third part includes a battery. The third part includes at least one vibration motor. The first part has a first length, the second part has a second length, and the first length and the second length are substantially identical to each other. The third part has a third length and the third length is longer than the first length or the second length. The length of the first connection unit is substantially identical to the length of the second connection unit.

According to various embodiments of the present disclosure, the first part is bent in a length direction with a first curvature radius, the second part is bent in a length direction with a second curvature radius, and the second curvature radius is substantially identical to the first curvature radius. The third part is bent in a length direction with a third curvature radius.

According to various embodiments of the present disclosure, at least one of the first part, the second part, and the third part includes at least one of a wired or wireless communication module, a processor, a battery, a vibration motor, a storage device, an audio module, a speaker, a microphone, an indicator, a switch, a hall sensor, a touch sensor, an acceleration sensor, a motion sensor, an electrical connection, and a button.

According to various embodiments of the present disclosure, the wearable device further include a wireless communication module configured to connect to an external device wirelessly, and a processor configured to respond to at least part of a connecting operation or a separating operation between the second end of the first part and the second end of the second part, wherein the processor performs a switching operation between a first state of being paired with an external device through the wireless communication module and a second state of transmitting/receiving sound data to/from an external device through the wireless communication module. The processor switches from the first state into the second state during the separating operation and switches from the second state into the first state during the connecting operation.

According to various embodiments of the present disclosure, the wearable device further includes at least one user interface configured to receive a user input, wherein at least part of the user interface is disabled or deactivated in the first state and at least part of the user interface is disabled or deactivated in the second state.

According to various embodiments of the present disclosure, the wearable device further includes at least one sensor configured to detect the connecting operation or the separating operation, on at least one of the second end of the first part and the second end of the second part and the sensor has an on state in the first and second states.

According to various embodiments of the present disclosure, the wearable device further includes at least one of a vibration motor, an acceleration sensor, and a motion sensor and the processor is configured to be capable of driving at least one of the vibration motor, the acceleration sensor, and the motion sensor in the first state.

According to various embodiments of the present disclosure, the processor 220 is configured to switch from the first state to the second state in response to at least part of an output from at least one of the acceleration sensor and the motion sensor. When a user does not wear an electronic device, the processor switches to a third state of substantially turning off all functions.

According to various embodiments of the present disclosure, in the second state, when the second end of the first part and the second end of the second part are connected to each other, the first and/or the second sound output module outputs a first volume and when the second end of the first part and the second end of the second part are separated from each other. The first and/or second sound output module outputs a second volume, and the first volume is greater than the second volume.

According to various embodiments of the present disclosure, while the first and second parts are connected, if receiving a call for the external device, the processor may notify a user through vibration or sound. When the first and second parts are separated, the processor may transmit a call reception request to the external device and may connect a call through the sound output module.

According to various embodiments of the present disclosure, the processor may control an output of the sound output module on the basis of the position or state information of the first and second parts. When receiving one of a specified button input. A voice input, and a motion input, the processor may connect a call for the call.

According to various embodiments of the present disclosure, while the first and second parts are separated, if receiving the call, the processor may notify a user of a call occurrence through the first and second sound output modules. The processor may provide sender information by a TTS method.

According to various embodiments of the present disclosure, while the first and second parts are separated, if receiving one of a specified button input, a voice input, and a motion input, the processor may request a call occurrence for a specified receiver from the external device.

According to various embodiments of the present disclosure, if the first and second parts are separated, the processor may play sound source and if the first and second parts are connected, may pause sound source playback. If the first and second parts are separated, the processor may activate an ANC function and if the first and second parts are connected, may deactivate the ANC function.

According to various embodiments of the present disclosure, while the first and second parts are connected, the wireless communication module may receive a signal for notifying the occurrence of an event of at least one of schedule guide, alarm, and message reception from the external device. When the first and second parts are separated, the processor may notify a user of the event through a TTS method and when the first and second parts are connected, may notify a user through vibration or sound.

According to various embodiments of the present disclosure, while the first and second parts are connected, if receiving one of a specified button input, a voice input, and a motion input, the processor may output sound through an external speaker.

As mentioned above, according to various embodiments of the present disclosure, by recognizing a connection state at both ends of an electronic device, a call function, a music playback function, a message reception function, and a schedule notification function may be conveniently provided to a user according to recognition information.

According to various embodiments of the present disclosure, a connection state at both ends of an electronic device, position information, or state information is collected by using various sensors and on the basis of the collected information, a convenient and efficient function may be provided according to a user's device usage intention.

Each of the above-mentioned components of the electronic device according to various embodiments of the present disclosure may be configured with at least one component and the name of a corresponding component may vary according to the kind of an electronic device. According to various embodiments of the present disclosure, an electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of an application-specific IC (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in computer-readable storage media. When at least one processor (for example, the processor 220) executes an instruction, it may perform a function corresponding to the instruction. The non-transitory computer-readable storage media may include the memory 230, for example.

The non-transitory computer-readable storage media may include hard disks, floppy disks, magnetic media (for example, magnetic tape), optical media (for example, compact disc ROM (CD-ROM), and DVD), magneto-optical media (for example, floptical disk), and hardware devices (for example, ROM, RAM, or flash memory). Additionally, a program instruction may include high-level language code executable by a computer using an interpreter in addition to machine code created by a complier. The hardware device may be configured to operate as at least one software module to perform an operation of various embodiments of the present disclosure and vice versa.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An audio device comprising:
a first sound device;
a second sound device;
a housing electrically coupled with the first sound device via a first flexible connector and electrically coupled with the second sound device via a second flexible connector, the housing comprising an input module to receive a user input or a sound from outside of the audio device;
a sensor to obtain information related to the first sound device or the second sound device; and
a processor adapted to:
determine that the first sound device is attached to the second sound device based at least in part on the information; and
deactivate the input module based at least in part on the determining that the first sound device is attached to the second sound device.

2. The audio device of claim 1, wherein the sensor is disposed in the first sound device or the second device and adapted to detect a magnetic field related to the first sound device or the second sound device, as at least part of the information.

3. The audio device of claim 1, wherein the sensor comprises a hall sensor, an optical sensor, an accelerometer or any combination thereof.

4. The audio device of claim 1, wherein the housing has a length shorter than the length of the first sound device or the second sound device.

5. The audio device of claim 1, wherein the first sound device includes a first curved portion having a first curvature radius, and the second part includes a second curved portion having a second curvature radius substantially identical to the first curvature radius.

6. The audio device of claim 1, wherein the input module comprises a button, a touch key, a microphone or any combination thereof.

7. The audio device of claim 1, wherein the housing has a diameter greater than the diameter of the first flexible connector or the second flexible connector.

8. The audio device of claim 1, further comprising:
activate the input module based at least in part on a determination that the first sound device is separated from the second sound device.

9. The audio device of claim 8, wherein the processor is adapted to:
perform the activating further based at least in part on a determination that a separation between the first sound device and the second sound device is maintained during a specified time.

10. The audio device of claim 1, wherein the audio device comprises a necklace-type earphone, an electronic necklace, a smart glasses or a goggle.

11. An audio device comprising:
a first sound device;
a second sound device;
a sensor to obtain information related to the first sound device or the second sound device; and
a processor adapted to:
output, using the first sound device or the second sound device, a sound while the audio device is in a first power state;
determine that the first sound device is attached to the second sound device based at least in part on the information;
transition the audio device from the first power state to a second power state, based at least in part on the determining that the first sound device is attached to the second sound device; and stop the outputting of the sound while the audio device is in the second power state.

12. The audio device of claim 11, wherein the sensor is disposed in the first sound device or the second device and adapted to detect a magnetic field related to the first sound device or the second sound device, as at least part of the information.

13. The audio device of claim 11, further comprising communication circuitry to establish, using the communication circuitry, a communication connection with an external electronic device, wherein the processor is adapted to:
obtain, using the communication connection, audio data corresponding to a content stored in the external electronic device or a call with respect to the external electronic device; and
perform the outputting based at least in part on the audio data.

14. The audio device of claim 13, wherein the processor is adapted to:
perform a noise cancellation with respect to a noise included in the audio data, as at least part of the outputting of the sound.

15. The audio device of claim 11, wherein a power consumption is greater when the audio device is in the first power state than when the audio device is in the second power state.

16. The audio device of claim 11, wherein the second power state comprises an inactive state, a low power state, a power-off state or any combination thereof.

17. The audio device of claim 11, further comprising a housing electrically coupled with the first sound device via a first flexible connector and electrically coupled with the second sound device via a second flexible connector, the housing comprising an input module including a button, a touch key or a microphone.

18. An audio device comprising:
communication circuitry to establish, a communication connection with an external electronic device;
a first sound device;
a second sound device;
a sensor to obtain information related to the first sound device or the second sound device; and
a processor adapted to:
determine, using the sensor, that one of the first and the second sound devices is presented at a first ear and another of the first and second sound devices is not presented at a second ear;
obtain, using the communication connection, a sound corresponding to a content stored in the external electronic device or a call with respect to the external electronic device; and
output the sound via the one of the first or second sound devices based at least in part on the determining, the outputting including refraining from outputting the sound via the other of the first and second sound devices.

19. The audio device of claim 18, wherein the processor is adapted to:
if a first audio signal corresponding to the content or the call is output via the external electronic device prior to the determining, output a second audio signal corresponding to the content or the call, as at least part of the outputting of the sound.

20. The audio device of claim 19, wherein the processor is adapted to:
perform a noise cancellation with respect to a noise included in the second audio signal, as at least part of the outputting of the second audio signal.

* * * * *